US009168619B2

(12) United States Patent
Goggin et al.

(10) Patent No.: US 9,168,619 B2
(45) Date of Patent: Oct. 27, 2015

(54) QUALITY CONTROL FOR A PRESSURE RELIEF DEVICE (71) Applicants: Paul Goggin, Nenagh (IE); Geoffrey Brazier, Woodbury, MN (US); John Tomasko, Limerick (IE)

(72) Inventors: Paul Goggin, Nenagh (IE); Geoffrey Brazier, Woodbury, MN (US); John Tomasko, Limerick (IE)

(73) Assignee: BS&B SAFETY SYSTEMS LIMITED, Limerick (IE)

( * ) Notice: Subject to any disclaimer, the term of this patent is extended or adjusted under 35 U.S.C. 154(b) by 113 days.

(21) Appl. No.: 13/767,311

(22) Filed: Feb. 14, 2013

(65) Prior Publication Data
US 2013/0205559 A1  Aug. 15, 2013

Related U.S. Application Data (60) Provisional application No. 61/633,570, filed on Feb. 14, 2012, provisional application No. 61/633,770, filed on Feb. 17, 2012.

(51) Int. Cl.
B23P 19/04 (2006.01)
F16K 37/00 (2006.01)
F16K 17/16 (2006.01)

(52) U.S. Cl.
CPC ............... B23P 19/04 (2013.01); F16K 17/16 (2013.01); F16K 37/0075 (2013.01); Y10T 29/49764 (2015.01); Y10T 29/49769 (2015.01); Y10T 29/49771 (2015.01); Y10T 29/49773 (2015.01)

(58) Field of Classification Search
CPC ..... B23P 19/04; F16K 17/16; F16K 37/0075; Y10T 29/49773; Y10T 29/49769; Y10T 29/49764; Y10T 29/49771
USPC ............... 29/407.05, 407.01, 407.04, 407.06; 220/89.1, 89.2, 560.04, 203.08
See application file for complete search history.

(56) References Cited

U.S. PATENT DOCUMENTS 2,716,506 A     8/1955   Fike
3,704,807 A    12/1972   Lidgard
2005/0285495 A1 12/2005  Yoshida

FOREIGN PATENT DOCUMENTS

DE   10 2007 051 550 A1    4/2009
GB       1 545 567          5/1979
WO   WO-2009/056404 A1     5/2009

OTHER PUBLICATIONS

PCT Notification of International Search report, PCT/US2013/026114, date of mailing: Jul. 4, 2013, International filed: Feb. 14, 2013 (9 pages).

Primary Examiner — John C Hong
(74) Attorney, Agent, or Firm — Finnegan, Henderson, Farabow, Garrett & Dunner, LLP (57) ABSTRACT A system and associated methods of quality control for a pressure relief device are disclosed. More specifically, a system and method including one or more of non-destructive dimensional or visual verification, unique identification (e.g., serialization), and image capture of a pressure relief device or a constituent component of such a device are disclosed. A system and method are disclosed in which a checked physical attribute of a pressure relief device, or component thereof, is compared against a statistically expected attribute to determine whether the device or component is suitable for further manufacture or delivery to a customer.

58 Claims, 4 Drawing Sheets

QUALITY CONTROL FOR A PRESSURE RELIEF DEVICE

CROSS REFERENCE TO RELATED APPLICATIONS

This application claims the benefit of U.S. Provisional Application No. 61/633,570, filed Feb. 14, 2012, by Paul Goggin, et al., and titled QUALITY CONTROL FOR A PRESSURE RELIEF DEVICE, the disclosure of which is expressly incorporated herein by reference. This application also claims the benefit of U.S. Provisional Application No. 61/633,770, filed Feb. 17, 2012, by Paul Goggin, et al., and titled QUALITY CONTROL FOR A PRESSURE RELIEF DEVICE, the disclosure of which is expressly incorporated herein by reference.

FIELD OF THE DISCLOSURE

This disclosure generally relates to a system and associated method for quality control of a pressure relief device. More specifically, this disclosure relates to a quality control system or method including one or more of dimensional verification, unique identification (e.g., serialization), and image capture of a pressure relief device or a constituent component of such a device.

BACKGROUND

A pressure relief device is commonly used as a safety device in a system containing a pressurized fluid in gas or liquid form. For example, a pressure relief device may vent fluid from the system when the pressure in the system reaches a predetermined level—usually before it reaches an unsafe level. A number of emergency conditions, including fire and unintended chemical reactions, can create potentially dangerous pressure levels, which require immediate relief to preserve the safety of the system.

One type of pressure relief device is a rupture disk. Generally, a rupture disk has a flange that is sealed between a pair of support members, or safety heads, forming a pressure relief assembly. An example of a support member or safety head is disclosed in co-owned U.S. Pat. No. 4,751,938, the entire contents of which are incorporated herein by reference. The pressure relief assembly then may be clamped, or otherwise sealingly disposed, between an inlet pipe and an outlet pipe in the pressurized system. The inlet pipe may conduct pressurized fluid to an inlet side of the rupture disk. The outlet pipe may connect to an outlet side of the rupture disk, providing an outlet to a safety reservoir or to the environment. In another application, a rupture disk may be positioned on an outlet of a pressurized system without being sealed between an inlet and an outlet pipe—e.g., by welding, bolting, or otherwise attaching directly to the pressurized system's outlet.

One type of rupture disk may have a dome-shaped, rounded-shaped, conical shape, truncated conical shape, or other generally curved rupturable portion and can be either forward-acting or reverse-acting. A forward-acting rupture disk is positioned with the concave side of the rupturable portion exposed to the pressurized system, placing the disk under tension. Thus, when an over-pressure condition is reached—i.e., when the system pressure exceeds a safe or desirable level—the rupture disk may release pressure by bursting outward. Conversely, a reverse-acting rupture disk (also known as a reverse buckling rupture disk) is positioned with its convex side exposed to the pressurized system, placing the material of the disk under compression. Thus, when an over-pressure condition is reached, the rupture disk may buckle and tear open to vent pressurized fluid.

A further type of rupture disk comprises a generally flat rupturable portion that might be produced from metal, graphite, plastic or ceramic material.

A rupture disk industry has historically manufactured dome-shaped, rounded-shaped, or other generally curved rupture disks and/or flat rupture disks by moving rupture disk material from work station to work station for sequential processing steps, either manually, by an automated process, or by a combination of the two. Another method of manufacturing a rupture disk is disclosed in co-owned U.S. patent application Ser. No. 12/923,622 and co-owned PCT Application No. PCT/US10/50779, which published as WO2011/041456, the entire contents of each of which are hereby incorporated herein by reference.

Rupture disk assemblies using cutting structures are described in co-owned U.S. Pat. Nos. 4,236,648 and 5,082,133, the contents of which are hereby expressly incorporated by reference in their entirety. Exemplary stress concentration points are described in co-owned U.S. Pat. No. 5,934,308, the contents of which are hereby expressly incorporated by reference in their entirety.

The predetermined pressure differential at which a rupture disk will rupture is known as the "burst pressure." The burst pressure for which a rupture disk is rated is known as the "nominal burst pressure." The burst pressure may be set by way of the rupture disk's physical parameters, such as material thickness and dome height (also known as "crown height"). The burst pressure also may be set using various physical features, such as indentations. A rupture disk having an indentation—and methods of manufacturing such rupture disks—is disclosed, for example, in co-owned U.S. Pat. Nos. 6,178,983, 6,321,582, 6,446,653, and 6,494,074, the contents of which are hereby incorporated by reference in their entirety.

Physical features, such as score lines and shear lines (and other areas of weakness, also known as lines of weakness), may be used to facilitate opening of a rupture disk and control the opening pattern of a rupture disk. In a reverse buckling disk, for example, the disk will tear along a line of weakness when the disk is activated by pressure. A score or shear line may be used in combination with a stress concentration point or cutting member. Selected portions of the disk may be left unscored, acting as a hinge area, to prevent the disk from fragmenting upon bursting and the fragments from the disk escaping along with fluid from the pressurized system. A central portion of the disk that is partially torn away from the rest of the disk may be referred to as a "petal."

A rupture disk may be combined with one or more elements to form a pressure relief device or a component of a pressure relief device. For example, a rupture disk may be combined with a holder device or a safety head assembly, to form a pressure relief device. A rupture disk may be fixed to a holder device by welding, crimping, adhesive bonding, compression fitting, or other suitable method.

Another type of a pressure relief device is a buckling pin valve. An example of a buckling pin valve appears in co-owned U.S. application Ser. No. 11/221,856, filed Sep. 9, 2005, and published as Publication No. US 2007/0056629, the entire contents of which are hereby incorporated by reference. Another example of a buckling pin valve appears in co-owned U.S. application Ser. No. 13/573,200, filed Aug. 30, 2012, the entire contents of which are hereby incorporated by reference. Components of a buckling pin valve may include a buckling pin, a spring, a collapsible washer, a Belleville spring, or other collapsible/deformable trigger element.

Another type of a pressure relief device is a vent. An example of an vent appears in co-owned U.S. application Ser. No. 10/831,494, filed Apr. 23, 2004, and published as Publication No. US 2005/0235584, the entire contents of which are hereby incorporated by reference. Another example of a vent appears in co-owned U.S. Pat. No. 7,950,408, the entire contents of which are hereby incorporated by reference.

A pressure relief device may be used with a sensor, such as a temperature sensor, pressure sensor, or an activation sensor.

The performance of a pressure relief device or a sensor may depend on a number of variables in its design. Variations in materials and manufacturing may result in any given two devices in a manufacturing lot of seemingly identical structure not activating at the same desired pressures. Similarly, variations in materials and manufacturing may result in any given two sensors from a manufacturing lot performing differently.

Currently, established codes and standards applicable to a pressure relief device focus on destructive testing as a means of qualifying a batch or lot of pressure relief devices. Typically, under routine testing practices, devices or components to be destructively tested are selected at random. For example, EN/ISO 4126-2 states that for a burst test, a "number of bursting disks . . . shall be selected at random from each batch and be subjected to burst testing . . . to verify that the burst pressure is in accordance with the specified requirements." If the tested unit or units perform within expected standardized burst pressure limits (e.g., +/−5% for American Society of Mechanical Engineers (ASME) code applicable to rupture disks having a burst pressure of 40 pounds-per-square inch or above), then the entire lot of devices or components may be accepted. As a result, more is known about the units destroyed by the manufacturer than the (untested) units that ship to a user. It cannot be determined, for example, whether a destructively tested unit was a best, worst, or averagely performing unit relative to the rest of its batch or lot.

Further established quality checks for a rupture disk have focused on dome height and burst diameter. However, a more precise check of quality—down to a microscopic level—is desired.

Another concern for the performance of a pressure relief device or a sensor may be whether the device or sensor is a legitimate, authorized product, or whether it is a counterfeit product.

In light of the foregoing, it may be desirable to have a quality control system for a pressure relief device, or a related component such as a sensor, which may combine one or more of dimensional verification, individual part serialization, and image capture. It also may be desirable to provide a quality control system or method that utilizes non-destructive analysis and/or testing of a pressure relief device component. Using non-destructive methods may achieve increased confidence in the expected performance in a pressure relief device component, and/or reduce or eliminate the need for potentially costly and wasteful destructive testing. It may also be desirable to include a security feature to identify a pressure relief device, or a related component such as a sensor, as being a legitimate, authorized product. The system and method of the present disclosure provides one or more of these, or other, features.

SUMMARY

To attain one or more of the above or other advantages, as embodied and described herein, the disclosure is directed to a method of ensuring the quality of a pressure relief device, comprising checking at least one physical attribute of a pressure relief device component to determine whether the component is suitable for use in a pressure relief device; applying a unique identifier to the component; and recording the at least one physical attribute of the component indexed to the unique identifier.

The disclosure is further directed to a method of ensuring the quality of a pressure relief device, comprising manufacturing a pressure relief device component; checking at least one physical attribute of the pressure relief device component to determine whether the component is suitable for use in a pressure relief device; applying a unique identifier to the component; and recording the at least one physical attribute of the component indexed to the unique identifier.

The disclosure also is directed to a method of ensuring the quality of a pressure relief device, comprising applying a unique identifier to each of a plurality of pressure relief device components; checking a physical attribute of each of the plurality of pressure relief device components; recording the physical attribute each of the plurality of pressure relief device components, indexed to the unique identifier corresponding to each of the plurality of pressure relief device components; determining a statistical distribution of the checked physical attribute of the plurality of pressure relief device components; and recording the statistical distribution.

The disclosure is further directed to a method of ensuring the quality of a pressure relief device, comprising manufacturing a pressure relief device component; taking at least one measurement of the pressure relief device component, wherein the at least one measurement is selected to determine whether the pressure relief device component is suitable for use in a pressure relief device; applying a unique identifier to the pressure relief device; and recording the at least one measurement indexed to the unique identifier.

The disclosure also is directed to a method of ensuring the quality of a pressure relief device, comprising manufacturing a pressure relief device component; applying a unique identifier to the pressure relief device component; and recording an image of the pressure relief device such that the unique identifier is visible.

Further, disclosure is directed to a method of ensuring the quality of a pressure relief device, comprising manufacturing a pressure relief device component; measuring at least one feature of the pressure relief device component; and recording an image of the pressure relief device such that the measured feature is visible.

Additionally disclosed is a method of ensuring the quality of a pressure relief device, comprising checking at least one physical attribute of a pressure relief device, wherein the at least one physical attribute will impact the intended performance of the pressure relief device; applying a unique identifier to the pressure relief device; and recording the at least one physical attribute of the pressure relief device indexed to the unique identifier.

Also disclosed is a method of ensuring the quality of a pressure relief device, comprising: checking at least one physical attribute of a component to be used in a pressure relief device, wherein the physical attribute may affect the intended performance of the component; and comparing the at least one physical attribute to an accepted range for the physical attribute, to evaluate whether the component is suitable for use in the pressure relief device.

Still further disclosed is a method of ensuring the quality of a pressure relief device, comprising: checking a physical attribute of each of a plurality of components to be used in a pressure relief device; determining an acceptable range of the checked physical attribute of the plurality of components; selecting at least one of the plurality of components having a checked physical attribute outside of the acceptable range; and destructively testing the at least one of the plurality of components having a checked physical attribute outside of the acceptable range.

BRIEF DESCRIPTION OF THE DRAWINGS

The accompanying drawings, which are incorporated in and constitute a part of this specification, illustrate several embodiments and together with the description, serve to explain principles of the disclosure.

DESCRIPTION OF THE EMBODIMENTS

Reference will now be made in detail to the present exemplary embodiments, examples of which are illustrated in the accompanying figures.

Figure 1:
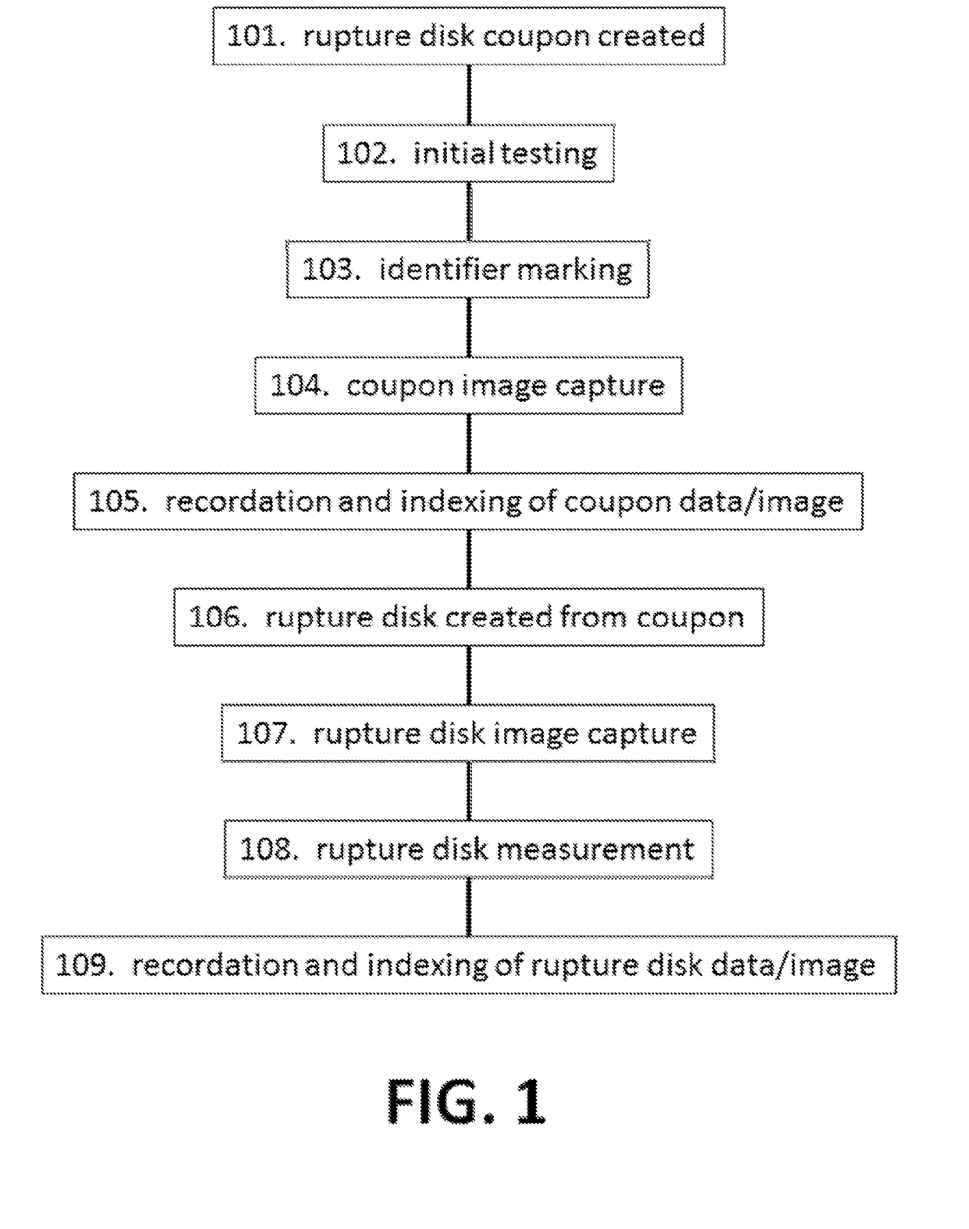
FIG. 1 is a flow chart depicting a process according to the present disclosure.

According to the embodiment of FIG. 1, a rupture disk coupon (a/k/a rupture disk blank) may be created from a raw material (Step 101). For example, the raw material may be a sheet of rupture disk material, e.g., a sheet metal. As another example, the raw material may be a coil of rupture disk material, e.g., a coil of metal. In one embodiment, a series of multiple coupons may be created from a single piece of raw material. A rupture disk coupon may be created out of non-metal raw material, such as, e.g., plastic, ceramic, or graphite. As another example, the raw material may be a series of blanks removed from plate, rod, bar or billet, purchased by the manufacturer.

Second, as illustrated in step 102 of FIG. 1, the coupon may be subject to initial testing to determine whether the coupon is suitable for use in a rupture disk, before it is subject to further manufacturing processes. In one embodiment, the initial testing may take the form of a dimensional measurement. For example, a device may be used to verify the thickness of the coupon. In one embodiment, the coupon may be subject to multiple measurements of thickness at different locations on the coupon. For example, a coupon's thickness may be measured at its center, and at one or more points away from its center. The locations where thickness is measured may be pre-selected, or may be selected at random. In one embodiment, a series of multiple coupons may be tested.

A device used to measure the thickness of a coupon may take the form of a tool that physically contacts the coupon material, such as, e.g., a caliper. In another embodiment, a measurement device may be a non-contact device, such as a laser or optical measurement system.

Measuring the thickness of a coupon before further manufacturing steps are taken may allow for increased control over the manufacturing process. For example, a coupon sample that is out of tolerance may be discarded at the coupon stage, instead of at a later stage (e.g., after the coupon has been shaped into a rupture disk or subject to other manufacturing steps), to avoid the risk of an out-of-specification coupon entering the batch or lot of finished pressure relief components. Further, a business method or system of collecting and analyzing measurement information may be used to identify suspected out-of-specification coupons for removal from a batch or lot at any stage of the pressure relief component manufacturing process. In one embodiment, a statistical analysis of collected measurement information may be used to identify suspected out-of-specification coupons to remove and/or discard. Thus, the present disclosure may add desirable efficiency to a rupture disk manufacturing process.

Although thickness measurements are described, a rupture disk coupon may additionally or alternatively be subject to other initial dimensional or visual tests. For example, initial testing may include a measurement of coupon flatness, coupon smoothness, coupon diameter, coupon width or presence of burrs, dents, or scratches.

Initial testing may include an observation or measurement of a grain direction in the coupon material. If a score or line of weakness is to be applied to a rupture disk, then rupture disk performance may be negatively impacted in the event that the score or line of weakness aligns with the grain direction in the coupon material. For example, if an X-shaped line of weakness is to be applied to a rupture disk, and the material grain direction aligns with (or is parallel to) one of the lines of the X-shape, then the rupture disk may tend to open in an irregular pattern favoring the line of the X-shape that is parallel to the grain. By performing an initial test to observe or measure the grain direction of the coupon material, it is possible to avoid aligning a line of weakness with the material grain. In this manner, irregular opening of a rupture disk having a line of weakness may be avoided.

In one embodiment, the coupon may be subject to a full-body scan. A full body scan may be performed by the use of a coordinate measurement machine (CMM) that can generate a dimensioned digital copy of the coupon. A digital copy of a rupture disk coupon may be compared electronically to one or more other digital copies of a rupture disk coupon (including through statistical analysis). In one embodiment, by comparing digital copies of rupture disk coupons formed by CMM measurements, imperfections or irregularities down to a micron level may be identified. In this manner, coupons that do not conform to an observed mean (within a prescribed tolerance) may be culled before further processing. Thus, manufacturing efficiencies may be attained. In addition, the performance of a rupture disk made from a remaining coupon may, as a result, fall within a tighter tolerance of burst pressure.

In one embodiment, the coupon may be subjected to a sophisticated measurement or measurements, such as, e.g., through the use of nuclear equipment that may measure the decay of materials, or the use of sophisticated equipment that may measure the conductivity or magnetic alignment of the coupon. The testing methods selected to test a coupon may be non-invasive and non-destructive. That is, the testing methods may be selected so as not to corrupt the coupon's suitability or reliability for eventual use in a rupture disk including where surface contact measurements risk leaving an unacceptable witness mark.

The initial coupon-testing step of the present disclosure may provide several advantages. Initial testing of a coupon may allow for statistical analysis of the component—as part of a business method or system—to improve quality, accuracy, precision, and reliability. Also, initial testing of a coupon may provide the capability to identify the cause of any inconsistencies, which may allow a manufacturer to adjust or modify its manufacturing process to eliminate or reduce the inconsistencies. Additionally or alternatively, in an embodiment wherein the testing data is recorded (as discussed below), the coupon-testing step may allow a manufacturer to provide quality data for a final product. For example, the manufacturer may verify that the initial testing data of a finished rupture disk, or a manufacturing lot of rupture disks, is within normal tolerances. In this manner, a manufacturer may be able to provide enhanced quality assurances to a customer or prospective customer that are above those identified by International Standards such as those promulgated by the American Society of Mechanical Engineers (ASME) or the International Organization for Standardization (ISO), including ASME Section VIII and EN/ISO Standard 4126. In an embodiment wherein each processed coupon is tested, the initial coupon-testing step of the present disclosure may result in 100% inspection of material coupons for the manufacturing of products shipped to a customer. This represents an advance over current inspection and/or testing methods driven by US (ASME Section VIII) and International Standards (EN/ISO 4126), in which only a sample of rupture disk units are tested or inspected, and the suitability of each shipped unit is merely inferred from a successful test or inspection of samples from the produced batch or lot.

In addition to, or alternatively to, dimensional testing, an initial coupon testing step may include methods such as Positive Materials Identification ("PMI") testing. In PMI testing, the material composition of a coupon may be determined. This can be used on an individual coupon or an entire batch of coupons. PMI testing may allow for the specific identification of the constituent elements within a coupon material. These results can be compared to identify individual parts or lots that deviate from the norm, whether the norm is specified by the material supplier or the pressure relief device manufacturer. Any such deviating components may be discarded if their composition falls outside of acceptable tolerances. PMI testing may ensure that high standards of material veracity— e.g., corrosion resistance, heat resistance, conductivity (or non-conductivity), or magnetic impermeability—may be maintained. Thus, PMI testing may greatly increase the in-service quality of supplied pressure relief devices.

Figure 2:
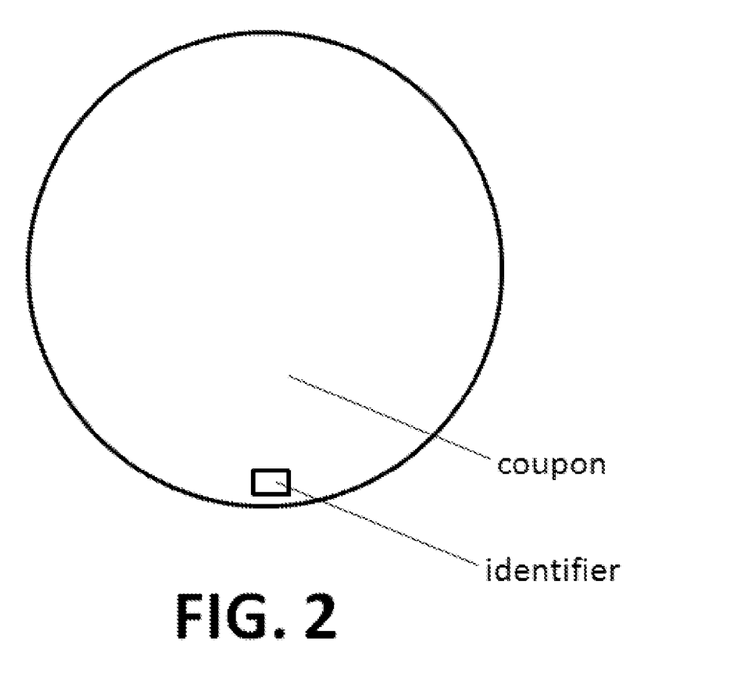
FIG. 2 is a depiction of an identifier applied to a rupture disk coupon.
Figure 3:
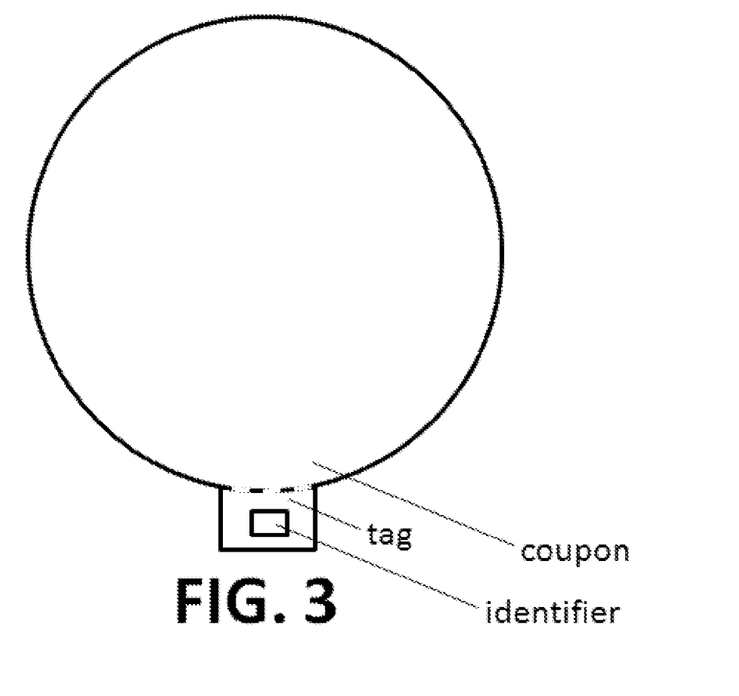
FIG. 3 is a depiction of an identifier applied to the tag of a rupture disk coupon.
Figure 5:
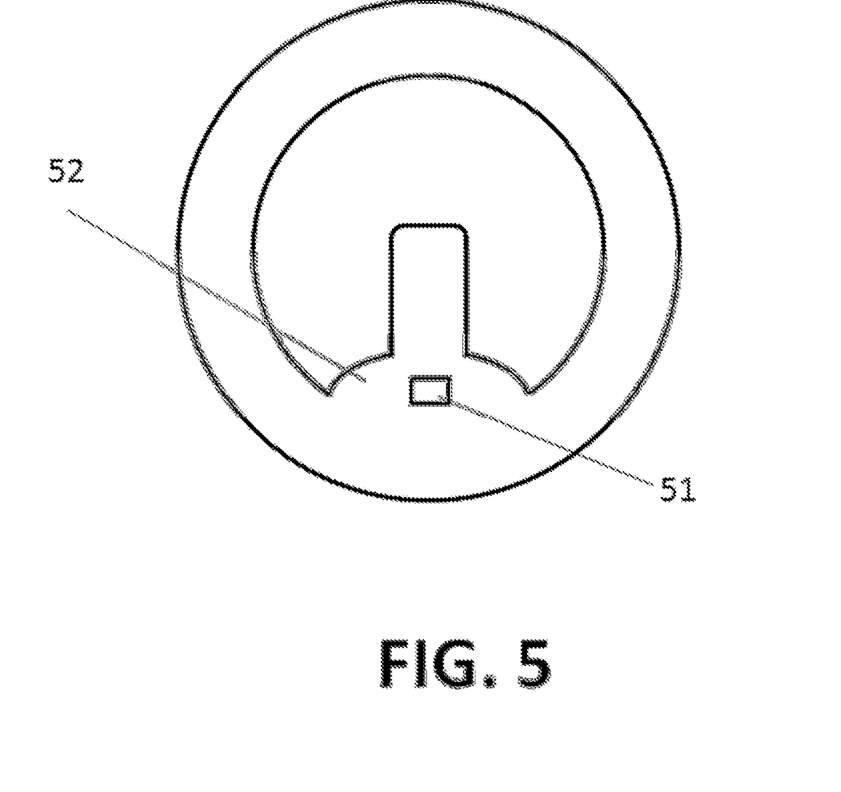
FIG. 5 is a depiction of an identifier applied to a supporting hinge for use with a rupture disk.

Third, as illustrated in step 103 of FIG. 1, the coupon may be marked with an identifier, which contains a unique identifier code. In one embodiment, the identifier may be a physical label 21, which can be attached directly to the coupon 20 (as illustrated in FIG. 2). In another embodiment, the identifier may be a physical label 31, which can be attached to a tag 32 of a coupon 30 (as illustrated in FIG. 3). In another embodiment, the identifier may be laser engraved, acid etched, printed, ink-jet marked, or otherwise applied to the coupon and/or its tag. The coupon identifier should be applied such that it will not interfere with the device's performance. For example, the coupon identifier should be applied in a manner that preserves the pressure-retention and pressure activation capabilities of the device—i.e., such that maximum leak tightness and design stability is maintained. In one embodiment, a unique identifier may be applied to a formed rupture disk (i.e., after the coupon has been formed into a rupture disk). A unique identifier may be applied near the perimeter of a rupture disk (e.g., on a flange portion of the rupture disk), and may be applied on the upstream and/or downstream side of the rupture disk. In a rupture disk provided with a supporting hinge 52 (as illustrated in FIG. 5), a unique identifier 51 additionally or alternatively may be applied to the supporting hinge. A rupture disk and an associated supporting hinge member may each be provided with the same identifier unique to the rupture disk assembly comprising the rupture disk and hinge. A unique identifier additionally or alternatively may be applied to a holder device, safety head, or other associated component used with a rupture disk in a rupture disk assembly.

A coupon identifier code may be an alphanumeric sequence; a 1-D, 2-D, or 3-D barcode; a Quick Response (QR) code or any other similar mark that allows for graphical storage of data. In one embodiment, an identifier code may contain a single identifying number. It is also contemplated that a code may include other data or media, such as, e.g., a hyperlink to an image or a video file detailing installation instructions or a portable document format (PDF) file containing safety information. Information included with a code may be encrypted. A code also may include information about the manufacturing process of the coupon or pressure relief device component, including information about units consumed during a destructive burst testing process. There may be implementation of a unique security code to certain pressure relief components to allow the manufacturer, or an approved representative, to identify their own products and manage counterfeit activities. A coupon identifier might be a Radio Frequency Identification (RFID) Tag rather than a physical label or direct marking.

A coupon identifier code may be read through the use of any suitable scanning system. A scanning system may be attached to a personal computer. In another embodiment, a scanning system may be a handheld integrated scanning system or a smartphone with the compatible software installed.

Providing a unique identifier to a rupture disk coupon may provide advantages. For example, uniquely identifying a rupture disk coupon may allow for tracking of bulk and individual parts throughout a manufacturing sequence. Unique identification may allow for the capturing and storage of data such as manufacturing data (e.g., size, material, burst pressure), logistical data (e.g., date manufactured, date shipped), and other such data. Additionally or alternatively, unique identification may allow for monitoring or tracking of parts externally through a networked interface. Unique identification may provide advantages throughout the lifetime of a rupture disk. For example, a unique identification number (and any informational indexing, as described herein) may facilitate accurate record keeping, help with troubleshooting installed disks and assist with correct identification of reorder requirements.

In one embodiment, a unique identifier may include a security feature to protect against, or help identify, an illegitimate, unauthorized, or counterfeit rupture disk. One security feature may be a serial number and/or lot number. A serial number may be unique for each rupture disk or rupture disk coupon. A lot number may be applied to all of the rupture disks or rupture disk coupons in a production lot or portion thereof. The use of a serial number and/or lot number by a manufacturer of a rupture disk or rupture disk coupon may allow the manufacturer (or a downstream seller or user) to verify the provenance and/or authenticity of a rupture disk or rupture disk coupon. For example, because a rupture disk counterfeiter may not have access to information about legitimate serial numbers and/or lot numbers, a counterfeit product is unlikely to include the correct serial and/or lot number on a counterfeit product. In another embodiment, a serial number and/or lot number may be presented and/or recorded in an encrypted form. For example, a serial number and/or lot number may be presented and/or recorded in the form of an encrypted bar code.

Certain codes and standards applicable to pressure relief devices and components may require that a lot number be marked on the device or component in a readable fashion. Thus, in one embodiment only a serial number may be presented and/or recorded in an encrypted form, with the lot number being presented in an unencrypted, readable fashion.

Fourth, as illustrated in step 104 of FIG. 1, an image of the coupon may be captured. For example, one or more photographs may be taken of the coupon. A photograph of the coupon may be a high-resolution image. An image of the coupon may or may not include the associated tagging and/or unique identifier applied to the coupon. A single image may be recorded or multiple images maybe recorded (at the same or different angles). In one embodiment, multiple images may be recorded and combined to give a 360 degree view of the coupon. In one embodiment, a video record of the coupon may be taken.

Capturing a coupon image may provide advantages. For example, capturing an image may allow for recording of the condition of the component before further manufacturing steps are taken. In this manner, if the quality of a disk is eventually called into question (e.g., after shipment or installation), a manufacturer may refer to a captured image of the component to verify initial quality (e.g., before shipment or installation). If an image includes a view of a unique identifier, the image may provide a digital record of that identifier.

Fifth, as illustrated in step 105 of FIG. 1, the test measurements and/or photographs of the coupon may be recorded and indexed to each coupon's unique identifier.

It is contemplated that the unique identification, image capture, and/or recordation and indexing described above may be performed on every coupon, regardless of whether testing or measurement indicates that the coupon is suitable for use in a rupture disk. In this manner, it may be possible to identify a pattern of which coupons are more likely to be unsuitable. Such information may be useful to diagnose systemic manufacturing problems or inefficiencies, which may then be remedied. Such information may also be used as a basis to discard a coupon from further wasteful processing. Alternatively, the unique identification, image capture, and/or recordation and indexing may only be performed on a coupon if it is deemed suitable for use in a rupture disk.

Sixth, as illustrated in step 106 of FIG. 1, a coupon may be manufactured into a finished product—i.e., a rupture disk.

Seventh, as illustrated in step 107 of FIG. 1, an image of the finished rupture disk may be captured and stored. For example, one or more photographs may be taken of the rupture disk. A photograph of the rupture disk may be a high-resolution image. An image of the rupture disk may or may not include the associated tagging—i.e., the image may include a view of a unique identifier applied to the coupon (and, as a result, to the finished rupture disk). A single image may be recorded or multiple images maybe recorded at different angles. In one embodiment, multiple images may be recorded and combined to give a 360 degree view of the rupture disk. In one embodiment, a video record of the coupon may be taken. An image may be taken of the rupture disk on its own and/or of the rupture disk within its final packaging.

By capturing a rupture disk's image with sufficient optical resolution (with or without a calibrated reference measurement in the field of view), the dimensions of critical characteristics such as dome diameter, outside diameter, score length, score position, and even score depth can be determined. Dimensional evaluation can take place at the time of rupture disk manufacture. A business method or system may include evaluating the image and/or dimensional data, to determine the acceptability of a batch or lot of multiple rupture disks intended to have the same nominal performance characteristics.

Capturing a rupture disk image may provide advantages. For example, capturing an image may allow for recording of the condition of the rupture disk before shipping or dispatch to a customer. In this manner, if a rupture disk is troubled in operation, or if the quality of the disk is called into question after shipment, a rupture disk manufacturer may determine based on a recorded image whether any defects were present before shipment. If an image includes a view of a unique identifier, the image may provide a digital record of that identifier. A captured image also may assist in the response to returned material queries. Capturing a rupture disk image may also provide advantages in inventory and sales tracking.

Eighth, as illustrated in step 108 of FIG. 1, one or more dimensions of a finished rupture disk may be recorded. A measurement system may be used to record dimensions such as the outer diameter, degree of uniformity of the dome structure, spherical shape of the dome, dome diameter, transition radius, crown height, score depth, dimple or indentation depth, and/or radius. In one embodiment, a measurement system may be a contact device, such as, for example, a caliper. In another embodiment, a measurement system may be a non-contact device, such as, for example, a laser or optical measurement system. In another embodiment, as noted above in connection with step 107, a high-resolution image of a rupture disk may be used to take a measurement of one or more rupture disk characteristics.

In one embodiment, a full profile of the rupture disk may be captured through dimensional measurement. For example, the profile of both the inlet and outlet sides of a rupture disk may be captured. In another embodiment, sufficient dimensional measurements may be taken to create a three-dimensional solid model of the rupture disk.

In one embodiment, a rupture disk may be subject to a full-body scan. A full body scan may be performed by the use of a coordinate measurement machine (CMM) that can generate a dimensioned digital copy of the rupture disk. That digital copy may be compared electronically to one or more other digital copies of a rupture disk (including through statistical analysis). In one embodiment, by comparing digital copies of rupture disks formed by CMM measurements, imperfections or irregularities down to a micron level may be identified. In this manner, rupture disks that do not conform to an observed mean (within a prescribed tolerance) may be culled before further processing or delivery to a customer. Thus, manufacturing efficiencies may be attained. In addition, the performance of the remaining rupture disks may, as a result, fall within a tighter tolerance of burst pressure.

Recording one or more dimensions of a finished rupture disk may provide advantages. For example, recording such dimension(s) may allow for the verification and recording of critical dimensions—i.e., dimensions that affect rupture disk performance. Those dimensions may be subject to a quality check to ensure that each rupture disk in a manufacturing lot fits within a normal distribution. In one embodiment, every disk in a manufacturing lot, rather than a few samples, may be subjected to a quality check. A quality check may allow verification that a critical dimension falls within acceptable tolerances. Such verification may achieve improved batch or lot consistency. Recording rupture disk dimensions may give a manufacturer the ability to carry out statistical analysis on a batch of rupture disks, as part of a business system or method. Such analysis may be used to improve manufacturing or other processes, or may be provided to a customer as an assurance of quality.

In one embodiment, a three-dimensional solid model of a rupture disk may be captured or recorded. A business method or system may include statistically analyzing the three-dimensional solid model for quality assurance. In one embodiment, a business method or system may include performing finite-element analysis (or other numerical methods) on the three-dimensional model to ascertain a quality of the rupture disk.

Depending on the type of rupture disk or other pressure relief device component, a unique set of criteria—e.g., specific dimensions and/or material composition—may be recorded and/or tested. By way of non-limiting example, in an unscored domed rupture disk, the dome height, dome curvature, and transition radius may be recorded and/or tested. If a domed rupture disk is scored and/or provided with an indentation or other feature, the score profile, score depth, indentation profile, or indentation depth may also or alternatively be recorded and/or tested. In a frustoconical rupture disk, the angle or profile of the disk may be recorded and/or tested. In a burst panel for an explosion vent, the panel profile, the profile of any burst panel features (e.g., score lines or indentations) may be recorded and/or tested.

The performance of a rupture disk or other pressure relief device component may depend on several critical criteria, which may determine the component's set pressure and/or longevity in service. A business method or system may include analyzing or testing a single critical criterion (e.g., dome height). Additionally or alternatively, multiple critical criteria (e.g., dome height and dome curvature) may be tested and analyzed relative to each other. For example, a system may be used to compare a rupture disk's dome height to dome curvature, to determine if the ratio between the two criteria falls out of tolerance.

Checking the critical criteria of a pressure relief device component may allow for both relative and isolated determinations of the integrity of a particular component. A "relative" determination of integrity may be performed by establishing an average or other measure of central tendency for one or more critical characteristics of a set of pressure relief device components (e.g., a batch or lot of rupture disk coupons). The outliers may then be identified to determine whether they should be used in a finished product. An "isolated" determination of integrity may be performed by analyzing the critical characteristics of a single pressure relief device component. For example, the symmetry or partial symmetry of such a component may be analyzed or tested to determine whether it should be used in a finished product.

Ninth, as illustrated in step 109 of FIG. 1, the rupture disk's image(s) and/or measurement data may be recorded and indexed to the unique identifier applied to the rupture disk's coupon (and, as a result, to the rupture disk itself). The image can be stored on a database to assist with future traceability. Historic image and/or dimensional data stored by the manufacturer also may be used to verify the expected characteristics of an individual or a group of rupture disks. An individual or group of rupture disks that falls outside of an acceptable range or other measurement of expected characteristics may be rejected and/or subject to additional testing (including destructive testing).

While the above described embodiments have been depicted as applied to a rupture disk and a rupture disk coupon, the disclosure is not limited to that structure or component. For example, a quality control system or method—including one or more of dimensional verification, application of a unique identifier, and image capture—may be applied to other components used as or with a pressure relief device. By way of non-limiting example, such components may include an explosion vent (or an explosion panel or other subcomponent of an explosion vent), a buckling pin valve (or a buckling pin or other subcomponent of a buckling pin valve), a sensor (such as, e.g., a pressure sensor or temperature sensor), a safety head assembly (or a safety head or other subcomponent of a safety head assembly), or a rupture disk assembly comprising both rupture disk and holder component combined together such as by welding, crimping or bonding. Additionally or alternatively, the disclosure also contemplates applying the disclosed methods to subcomponents of pressure relief devices, including (but not limited to) the pressure relief devices listed above. Such subcomponents may include, for example, a spring used in or with a relief valve.

Pressure relief devices which depend upon destruction of one or more components during activation particularly benefit from the ability to conduct highly accurate measurements for identification and comparison to an average or other measure of central tendency, which may allow outlying finished or intermediate processed items to be withdrawn from supply. Alternatively, a business system or method may include selecting suspected outlying components (or batches or lots of components) and subjecting them to further testing (including destructive testing). Such further testing (including destructive testing) may provide further assurances of the integrity of a final batch of components.

Figure 4:
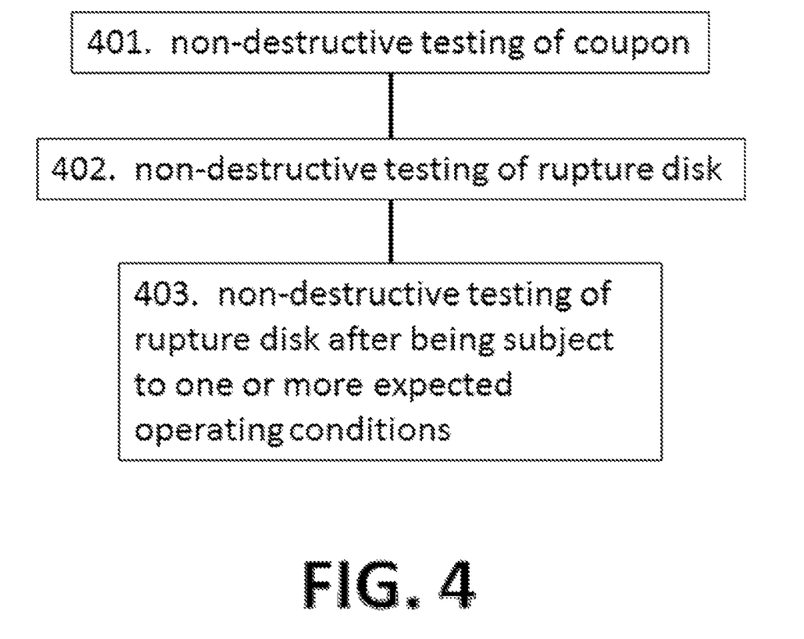
FIG. 4 is a flow chart depicting a process according to another embodiment of the present disclosure.

It is further contemplated that non-destructive testing or analysis may be performed before and/or after a rupture disk component is subjected to one or more expected operating conditions. For example, in an embodiment involving a rupture disk, non-destructive testing or analysis may be performed at one or more of the junctures identified in FIG. 4. First, a rupture disk coupon may be tested or analyzed in a non-destructive manner (Step 401). Second, as illustrated in Step 402, non-destructive testing or analysis may be performed on a rupture disk formed from the rupture disk coupon. Third, as illustrated in Step 403, the rupture disk may be subject to one or more expected operating conditions (such as, e.g., a series of pressure excursions, a series of temperature excursions, and/or exposure to a corrosive medium). After the rupture disk is exposed to one or more expected operating conditions (either through simulated tests or in actual service), the rupture disk may once again be subjected to non-destructive testing or analysis. The results of each non-destructive test or analysis may be recorded and compared to each other. In this manner, one may project or model the expected ongoing capability of a rupture disk in service. Such a projection or model may allow a rupture disk manufacturer to improve the design of a rupture disk, set an expiration date or inspection schedule for a rupture disk, and/or tailor the duration of a rupture disk warranty based on the expected implementation of a rupture disk.

The non-destructive testing and analysis methods identified above may be used in conjunction with or instead of destructive testing of selected samples. For example, a measurement or other characteristic of a shipped rupture disk may be directly compared with a corresponding measurement/characteristic of a destructively tested sample rupture disk. In this manner, one may strengthen the correlation between the expected performance of a shipped rupture disk and the actual performance of a destructively tested rupture disk. Thus, the disclosed systems and methods involving non-destructive testing and analysis may be integrated with, and improve upon, traditional codes and standards that require destructive testing. In another embodiment, however, a business method or system may rely exclusively on non-destructive techniques and avoid entirely the expense of destructive testing. Destructive testing may be avoided, for example, in the event that destructive testing is not specifically required by a traditional code or standard.

It is contemplated that individual features of one embodiment may be added to, or substituted for, individual features of another embodiment. Accordingly, it is within the scope of this disclosure to cover embodiments resulting from substitution and replacement of different features between different embodiments. The aforementioned embodiments may be used individually or in concert in any combination to form a system.

The above described embodiments and arrangements are intended only to be exemplary of contemplated systems and methods. Other embodiments will be apparent to those skilled in the art from consideration of the specification and practice of the disclosure herein.

What is claimed is:

1. A method of ensuring a quality of a pressure relief device, comprising:
   checking at least one physical attribute of a component to be used in a pressure relief device to determine whether the component is suitable for use in the pressure relief device;
   applying a unique identifier to the component; and
   recording the at least one physical attribute of the component.

2. The method of claim 1, wherein checking the at least one physical attribute comprises measuring at least one physical dimension of the component.

3. The method of claim 1, wherein checking the at least one physical attribute comprises generating a dimensioned digital copy of the component.

4. The method of claim 3, wherein checking the at least one physical attribute further comprises performing a finite element analysis of the digital copy of the component.

5. The method of claim 1, wherein checking the at least one physical attribute comprises performing a visual check of the component.

6. The method of claim 1, wherein checking the at least one physical attribute comprises conducting one of positive materials identification testing, nuclear decay testing, conductivity testing, and magnetic alignment testing.

7. The method of claim 1, wherein applying the unique identifier comprises applying a serial number and/or lot number to the component.

8. The method of claim 7, wherein applying the serial number and/or lot number further comprises applying an encrypted serial number and/or an encrypted lot number.

9. The method of claim 1, wherein applying the unique identifier comprises applying the unique identifier to the component by one of ink-jet marking, laser marking, acid-etching, and engraving.

10. The method of claim 1, wherein applying the unique identifier comprises affixing a tag to the component.

11. The method of claim 10, wherein affixing the tag to the component comprises affixing one of an RFID tag, a barcode tag, and a QR code tag.

12. The method of claim 1, wherein applying the unique identifier further comprises providing an identifier code, wherein the identifier code is electronically linked to information related to the component.

13. The method of claim 1, further comprising creating an index correlating the at least one physical attribute to the unique identifier.

14. The method of claim 1, further comprising:
   capturing an image of the component;
   recording the image of the component with the record of the at least one physical attribute.

15. The method of claim 14, wherein capturing an image further comprises capturing a view of the unique identifier to be visible within the captured image.

16. The method of claim 1, further comprising:
   manufacturing the pressure relief device with the component;
   checking at least one physical attribute of the pressure relief device; and
   recording the at least one physical attribute of the pressure relief device.

17. The method of claim 16, further comprising creating an index correlating the at least one physical attribute to the unique identifier.

18. The method of claim 16, further comprising
   capturing an image of the pressure relief device; and
   recording the image of the pressure relief device.

19. The method of claim 18, further comprising creating an index correlating the recorded image of the pressure relief device to the unique identifier.

20. The method of claim 1, further comprising providing the component for the pressure relief device.

21. The method of claim 20, wherein providing the component comprises providing a rupture disk coupon.

22. The method of claim 21, wherein checking at least one physical attribute comprises measuring a physical dimension of the rupture disk coupon.

23. The method of claim 21, wherein checking at least one physical attribute comprises measuring a material composition of the rupture disk coupon.

24. The method of claim 21, wherein checking at least one physical attribute comprises making a visual check of the rupture disk coupon.

25. The method of claim 20, wherein providing the component comprises providing a rupture disk.

26. The method of claim 25, wherein checking at least one physical attribute comprises measuring a physical dimension of the rupture disk.

27. The method of claim 25, wherein checking at least one physical attribute comprises making a visual check of the rupture disk coupon.

28. The method of claim 25, wherein providing the component further comprises providing at least one line of weakness in the rupture disk.

29. The method of claim 28, wherein checking at least one physical attribute comprises measuring a physical dimension of the at least one line of weakness.

30. The method of claim 28, wherein checking at least one physical attribute comprises making a visual check of the at least one line of weakness.

31. The method of claim 20, wherein providing the component comprises providing one of a buckling pin, a vent burst panel, a sensor component for a pressure relief device, a safety head, a rupture disk cutting device, a stress concentration point for a rupture disk, and a spring.

32. The method of claim 20, wherein providing the component comprises combining at least two subcomponents into a single component.

33. A method of ensuring a quality of a pressure relief device, comprising:
   applying a unique identifier to each of a plurality of pressure relief device components;
   checking a physical attribute of each of the plurality of components;
   recording the physical attribute of each of the plurality of components;
   determining a statistical distribution of the checked physical attribute of the plurality of components; and
   recording the statistical distribution.

34. The method of claim 33, further comprising creating an index correlating the physical attribute of each of the plurality of components to the unique identifier corresponding to each of the plurality of components.

35. The method of claim 33, further comprising:
determining an acceptable range of the checked physical attribute of the plurality of components;
selecting at least one of the plurality of components having a checked physical attribute outside of the acceptable range; and
destructively testing the at least one of the plurality of components having a checked physical attribute outside of the acceptable range.

36. The method of claim 35, wherein determining an acceptable range of the checked physical attribute further comprises at least one of the following: measuring an average of the checked physical attribute; measuring a median of the checked physical attribute; measuring a mode of the checked physical attribute; and identifying a range within which a predetermined percentage of the checked physical attributes should fall.

37. A method of ensuring a quality of a pressure relief device, comprising:
providing a pressure relief device component;
measuring at least one feature of the component;
capturing an image of the component such that the measured feature is visible; and
recording the measurement of at least one feature of the component with the captured image, so that the recorded measurement may be verified by referencing the captured image.

38. A method of ensuring a quality of a pressure relief device, comprising:
checking at least one physical attribute of a pressure relief device, wherein the at least one physical attribute will impact the intended performance of the pressure relief device;
applying a unique identifier to the pressure relief device; and
recording the at least one physical attribute of the pressure relief device and the unique identifier.

39. The method of claim 38, wherein checking the at least one physical attribute comprises measuring at least one physical dimension of the pressure relief device.

40. The method of claim 38, wherein checking the at least one physical attribute comprises generating a dimensioned digital copy of the pressure relief device.

41. The method of claim 38, wherein checking the at least one physical attribute comprises a visual check of the pressure relief device.

42. The method of claim 38, wherein checking the at least one physical attribute comprises conducting one of positive materials identification testing, nuclear decay testing, conductivity testing, and magnetic alignment testing.

43. The method of claim 38, wherein the pressure relief device comprises at least two components, and wherein checking at least one physical attribute comprises checking the integrity of an interface between the at least two components of the pressure relief device.

44. The method of claim 38, wherein applying the unique identifier comprises applying the unique identifier to the pressure relief device by one of ink-jet marking, laser marking, acid-etching, and engraving.

45. The method of claim 38, wherein applying the unique identifier comprises affixing a tag to the pressure relief device.

46. The method of claim 45, wherein affixing the tag to the pressure relief device comprises affixing one of an RFID tag, a barcode tag, and a QR code tag.

47. The method of claim 38, wherein applying the unique identifier further comprises providing an identifier code, wherein the identifier code is electronically linked to information related to the pressure relief device.

48. The method of claim 38, further comprising:
capturing an image of the pressure relief device;
recording the image of the pressure relief device; and
indexing the image of the pressure relief device to the unique identifier.

49. The method of claim 38, wherein applying the unique identifier further comprises providing an identifier code, wherein the identifier code is electronically linked to information related to the pressure relief device.

50. A method of ensuring a quality of a pressure relief device, comprising:
checking at least one physical attribute of a component to be used in a pressure relief device, wherein the physical attribute may affect the intended performance of the component; and
comparing the at least one physical attribute to an accepted range for the physical attribute, to evaluate whether the component is suitable for use in the pressure relief device.

51. The method of claim 50, wherein checking the at least one physical attribute comprises measuring at least one physical dimension of the component.

52. The method of claim 50, wherein checking the at least one physical attribute comprises generating a dimensioned digital copy of the component.

53. The method of claim 52, wherein checking the at least one physical attribute further comprises performing a finite element analysis of the digital copy of the component.

54. The method of claim 50, wherein checking the at least one physical attribute comprises performing a visual check of the component.

55. The method of claim 50, wherein checking the at least one physical attribute comprises conducting one of positive materials identification testing, nuclear decay testing, conductivity testing, and magnetic alignment testing.

56. The method of claim 50, further comprising:
recording the at least one physical attribute of the component;
capturing an image of the component;
recording the image of the component with the record of the at least one physical attribute to allow visual verification of the record of the at least one physical attribute.

57. A method of ensuring a quality of a pressure relief device, comprising:
checking a physical attribute of each of a plurality of components to be used in a pressure relief device;
determining an acceptable range of the checked physical attribute of the plurality of components;
selecting at least one of the plurality of components having a checked physical attribute outside of the acceptable range; and
destructively testing the at least one of the plurality of components having a checked physical attribute outside of the acceptable range.

58. The method of claim 57, wherein determining an acceptable range of the checked physical attribute further comprises at least one of the following: measuring an average of the checked physical attribute; measuring a median of the checked physical attribute; measuring a mode of the checked physical attribute; and identifying a range within which a predetermined percentage of the checked physical attributes should fall.

* * * * *